United States Patent [19]

Gerenrot et al.

[11] Patent Number: 5,437,738
[45] Date of Patent: Aug. 1, 1995

[54] FLUXES FOR LEAD-FREE GALVANIZING

[76] Inventors: Yum Gerenrot, 3842 Dolphin Dr., Allison Park, Pa. 15101; David Leychkis, 5820 Elwood St., Pittsburgh, Pa. 15232; Thomas L. Ranck, 1443 Mohican Trail, St. Charles, Mo. 63376; James L. Griffin, 11 Hosack Rd., Jackson Center, Pa. 16133; Gary Stefanick, 1945 Richardson Dr., Hubbard, Ohio 44425

[21] Appl. No.: 264,133

[22] Filed: Jun. 21, 1994

[51] Int. Cl.⁶ .............................................. B23K 35/34
[52] U.S. Cl. ................................... 148/26; 148/23
[58] Field of Search ............... 148/26, 23; 427/433; 204/38.5

[56] References Cited

U.S. PATENT DOCUMENTS

| | | | |
|---|---|---|---|
| 3,194,695 | 7/1965 | Yanagawa | 148/26 |
| 3,380,862 | 4/1968 | O'Brien | 148/26 |
| 3,409,477 | 11/1968 | Ash | 148/26 |
| 3,895,973 | 7/1975 | Stayner | 148/25 |
| 4,042,731 | 8/1977 | Chay | 148/26 |
| 4,448,748 | 5/1984 | Radtke et al. | 420/514 |
| 4,496,612 | 1/1985 | McNutt et al. | 427/310 |
| 4,505,958 | 3/1985 | Lieber et al. | 227/433 |
| 4,738,758 | 4/1988 | Renaux et al. | 204/38.5 |
| 4,802,932 | 2/1989 | Billiet | 148/26 |
| 5,053,112 | 10/1991 | Jones et al. | 204/38.5 |
| 5,116,432 | 5/1992 | Kerner | 148/25 |

FOREIGN PATENT DOCUMENTS

0488432A1  2/1991  European Pat. Off. .

*Primary Examiner*—Peter D. Rosenberg
*Attorney, Agent, or Firm*—John E. Miller

[57] ABSTRACT

The thermal resistance of a zinc chloride/ammonium chloride galvanizing preflux is improved by incorporating therein boric acid, other alkali metal chlorides and an aliphatic amino derivative. An improved zinc chloride/ammonium chloride galvanizing, top-flux includes a deoxidizer such as graphite or charcoal, other alkali metal chlorides and a foaming agent. Both compositions, the preflux and the top-flux, can be used to advantage in galvanizing steel with low lead or no lead zinc.

17 Claims, No Drawings

FLUXES FOR LEAD-FREE GALVANIZING

BACKGROUND OF THE INVENTION

For many decades lead was used as a very important galvanizing bath component in both batch and continuous galvanizing processes. Lead significantly reduces surface tension of molten zinc and increases its fluidity. This results in better wetting of the steel surface to be coated and higher drainage after withdrawal of the parts from the kettle. Lead to some degree counteracts the deleterious effect of iron in zinc on wetting behavior and reduces dross generation. Lead creates a specific crystalline pattern in the galvanized surface, so called spangles, which do not influence corrosion resistance and have only an aesthetic advantage.

But the main benefit of lead's presence in zinc is that it makes the process of galvanizing less demanding and less sensitive to many unfavorable circumstances, like insufficiently pickled, cleaned and even rusty steel surfaces, the absence of preheating and even drying when wet parts are immersed in molten zinc, and so on.

Unfortunately, lead cannot now be used for galvanizing steel parts coming into contact with drinking water, since small but significant quantities of lead from the galvanized parts dissolve in the water. Such dissolved lead may be accumulated in human and animal bodies with very deleterious results. Consequently, a number of state legislatures have passed laws which, starting in 1995, forbid the presence of lead in galvanized products which contact drinking water.

Attempts have been made to reduce lead level from conventional levels (for example, 0.5 to 1.4 wt. % in Prime Western grade zinc, ASTM B6-87), but all such attempts have resulted in bad wetting of steel parts leading to finished products with a high percentage of uncoated surfaces (black or bare spots).

Many patents describe improved formulations for top-flux and preflux solutions used in galvanizing. None of them, however, discloses galvanizing with low or no lead in batch or continuous operation.

For example, U.S. Pat. No. 3,740,275 describes a galvanizing preflux composition which does not contain ammonium chloride. The main ingredients of this formulation are zinc chloride (35 to 75%), borax or boric acid (5 to 15%), potassium aluminum fluoride (5 to 10%), sodium chloride (10 to 20%) and barium or calcium chloride (10 to 20%). The above ingredients are dissolved in water in the stated proportions to the strength of 18° Bé. When heated to 165° C., they are said to produce good results on thin gauge steel.

The same author in U.S. Pat. No. 3,244,551 suggests top-flux compositions without ammonium chloride which comprise zinc chloride (55 to 70%), potassium aluminum fluoride (10 to 15%), potassium chloride (10 to 15%), sodium chloride, barium chloride and calcium chloride (10 to 15%).

To improve steel surface wetting by molten zinc, U.S. Pat. No. 3,030,242 proposes preflux formulations which contain zinc chloride, ammonium chloride and film-forming cellulose derivative like carboxymethyl cellulose (0.1 to 3.0% of the fluxing material by weight) or carboxyalkyl cellulose and their salts.

In U.S. Pat. No. 3,816,188 low fuming top-fluxes are described. They are said to provide superior fluxing activity and contain zinc chloride or zinc bromide, zinc phosphate or zinc phosphite, small amount of foaming agent and a chloride or bromide of sodium potassium, lithium, magnesium and/or calcium. It is mentioned that these fluxes are advantageously employed whether the bath metal is zinc, as in conventional galvanizing, or zinc alloy.

U.S. Pat. No. 2,473,579 describes foaming-type galvanizing top-fluxes, where certain organic compounds having at least one aromatic ring connected with at least two carbonyl groups are used as foaming agents. According to the invention, these fluxes remain remarkably fluid during use and help to obtain complete coating of steel parts by molten zinc.

All these prefluxes and top-fluxes were tested for low lead or lead-free galvanizing, but none of them gave good results. Rather, steel surface wetting by molten zinc was bad, and a lot of uncoated (bare) spots were obtained.

SUMMARY OF THE INVENTION

The present invention provides preflux and top-flux formulations by which steel products can be easily coated by low lead (0.05 to 0.1 wt. %) or lead-free (less than 0.05 wt. %, even as low as 0.003 wt. %) zinc, both in batch and continuous technologies. These fluxes provide good wetting of steel surfaces by molten zinc and good adhesion.

Two possible versions of using these fluxes are provided by the present invention. In the first version, the preflux version, steel products after cleaning, pickling and rinsing are immersed in hot preflux solution, preferably with a density of 18° to 21° Bé. They are then withdrawn and are preheated to high temperature (i.e., above 180° C., typically 200° to 350° C.), after which they are dipped into molten low lead or lead-free zinc. The thermal resistant preflux used in this procedure is the subject of the present invention.

In the second version, the top-flux version, the above thermal resistant preflux, or some other conventional preflux, is used. In this version, the steel parts are preheated to 120°–180° C. and galvanized using the novel top-flux of the present invention. This top-flux prevents molten zinc spattering and oxidizing and provides good wetting of steel surfaces by low-lead or lead-free zinc and good adhesion.

DETAILED DESCRIPTION OF THE INVENTION

It is known in the art that steel parts after fluxing should be preheated before galvanizing to prevent molten metal spattering and provide good wetting and adhesion. In continuous technology this is done with necessity, otherwise the equipment productivity would be unreasonably low. On continuous galvanizing lines, steel strip after prefluxing and before immersing in molten zinc is preheated. Usually, this preheating is done merely for the purpose of drying, and then only to temperatures not higher than 100° to 120° C. Only a few plants with continuous galvanizing lines have furnaces where preheating can be done up to 200° to 250° C.

Unless otherwise specified, the temperatures mentioned herein refer to the temperature of the steel article itself, not the oven temperature. The temperatures to which the steel articles are heated can be measured, for example, by means of a thermocouple attached to the surface of the article.

In batch operations, the situation is considerably different than in continuous operation. The best that is done in batch technology in terms of preheating the steel article before dipping into the galvanizing bath is fluxing in hot (80° to 90° C.) solution and drying at ambient temperature before immersing parts in the galvanizing kettle. Very often fluxed parts are dipped while still wet into the kettle, which causes spattering and even explosions.

The presence of lead in the zinc kettle somehow compensates for bad galvanizing practices. More than that, lead allows good coating to be obtained on insufficiently pickled and cleaned surfaces. Sometimes, steel surfaces with heavy rust can be galvanized when lead is present though adhesion, of course, is bad. As a whole, lead makes galvanizing a very undemanding and forgiving process.

This positive influence of lead is usually ascribed to a reduction in the surface tension of molten zinc from 760 to 520 dyn/cm at 1 wt. % lead. But we think that the high wetting ability of zinc with lead can not be explained solely by reason of surface tension drop. That is why heat transfer and metallurgical aspects of galvanizing were investigated in an attempt to identify lead's influence.

It is well known that when a steel part at ambient temperatures is immersed in molten zinc, a layer of frozen (crystalline) metal is formed on the steel surface.

The bigger the part mass and the lower the temperatures of the kettle and the part, the thicker the frozen layer. It is understood that when the layer of zinc on the steel surface is in solid form there is no wetting and no adhesion of frozen zinc to the steel surface. This can be easily proved, for example, by withdrawing a panel from the kettle and cooling. When this is done, a thick (3 to 5 mm) frozen zinc layer is separated from the panel. A dark steel surface with flux remnants thereon will be revealed.

When a steel part is placed in a galvanizing kettle, the part is heated by the heat content of the molten zinc and the frozen zinc layer on the part surface is gradually melted. When this layer is totally melted, the steel surface becomes wetted by molten zinc and growth of the zinc-iron intermetallic alloy starts.

In developing the present invention, a series of experiments was made. Steel panels $4 \times 150 \times 150$ mm in size after cleaning, pickling and rinsing were fluxed and dried in the oven at 120° to 150° C. Then panels were cooled to ambient temperature and immersed in molten metal. Panels were kept in the kettle for 4 to 20 seconds with two second intervals, after which they were withdrawn, and the frozen layer of zinc was evaluated. The same procedure was made at kettle temperatures of 440°, 454°, and 468° C. and lead levels of 0.0, 0.2, 0.5 and 1.0%.

It was discovered that, at each temperature, the higher the lead level, the faster the frozen zinc layer is melted. In a kettle without lead at 454° C., the frozen zinc layer remelts totally in 12 to 15 seconds. When 1.0% lead is included in the molten zinc, melt time is reduced to 5 to 7 seconds. In effect, this means that the panel preheating before immersion in the kettle provides the same results as lead alloying. If, for example, a steel panel after fluxing is preheated to 200° C. and is then immersed in the galvanizing kettle without lead at 454° C., the frozen zinc layer is totally remelted after 5–6 seconds.

The phenomenon described above may be explained by lead liquation at the grain boundaries during crystallization (lead solubility in solid zinc does not exceed 0.003%), and its remelting by heating after the panel is immersed in the kettle but before the panel reaches kettle temperature. This means easier zinc grain separation and faster frozen layer remelting. There may exist some other explanation why lead accelerates zinc remelt, but it should be clearly understood that lead dramatically reduces the time period between immersing the panel in the kettle and its wetting by molten zinc which occurs when the frozen zinc layer is totally remelted.

In carrying out the first version of the present invention when using the inventive thermally-resistant preflux, sufficiently high preheating, i.e., above 180° C., preferably 200° to 350° C., of the parts should be conducted so that wetting of the steel surfaces by molten zinc happens as soon as possible. Preheating can be made in electric, infrared or gas furnaces, both in batch operation and continuously. Conventional fluxes, which contain only zinc chloride and ammonium chloride are unable to withstand high temperature preheating (350° C.) for a short period of time (less than 1 minute) in continuous process or relatively long periods of time in the oven (3 to 15 minutes) at lower temperatures (250° C.) in batch technology. An object of the present invention, therefore, is to provide a thermally-resistant preflux, preferably in the form of an aqueous solution, which when applied to steel articles is not decomposed or burned while heated to 350° C. for 1 minute or to 200° to 250° C. for 3 to 15 minutes. At the same time this flux neutralizes the poisoning action of aluminum as well as deleterious impurities in the galvanizing kettle and provides good wetting and adhesion of low lead and lead-free zinc coatings with or without added aluminum. It is preferred, in accordance with the present invention, that steel parts before fluxing are thoroughly cleaned, pickled and rinsed.

Thermal resistance is achieved in accordance with the present invention by adding to a zinc chloride/ammonium chloride mixture (preferably in aqueous form) boric acid in the amount of about 0.1 to 1.0%. The concentration range of boric acid is critical and lies beyond the scope of U.S. Pat. No. 3,740,275 (5 to 15%). This concentration range produces an unexpected result—it increases preflux thermal stability, which is not disclosed in the cited U.S. patent. Increasing boric acid, or borax, concentration significantly over 1.0% causes precipitation of some zinc-boric acid chemical compounds and decreases the wetting ability of molten zinc with lead, to say nothing about lead absence.

In addition to boric acid, other analogous compounds can also be used, such as the salts of boric acid, especially the alkali and alkaline earth metal salts, particularly the sodium, potassium, magnesium and calcium salts.

We also found out that boric acid can produce good results only in the presence of ammonium chloride. Otherwise, the steel surface is not wetted by molten zinc.

Moreover, including in the preflux a metal chloride, particularly a chloride of an alkali or alkaline earth metal like potassium, sodium, calcium magnesium, barium and others, improves the fluidity of the flux and contributes to better melting of the steel surface. Preferably, the amount of such metal chloride included in the preflux is 0.1 to 5 wt. %, more preferably about 0.1 to 2 wt. %.

It is known that steel parts corrode in aqueous prefluxes, and that iron is accumulated in the preflux tank. The rate of steel dissolution is accelerated by heating the tank to 80° to 90° C. Iron accumulation significantly worsens wetting of steel surfaces by molten zinc, especially in the absence of lead.

Now it is common to use corrosion inhibitors in pickling tanks, but as far as we know they are not applied to aqueous galvanizing prefluxes. To some extent, an inhibiting effect is achieved by surfactants, which sometimes are added to aqueous prefluxes to improve steel surface wetting, especially if the steel part is badly cleaned.

According to our data, inhibitors chosen from amino derivatives can reduce the rate of iron accumulation in aqueous prefluxes more than 2 to 3 times as compared with surfactants conventionally used in such prefluxes. By "amino derivatives" is meant compounds which inhibit the oxidation of steel and which also contain an amino group. Aliphatic alkyl amines and quaternary ammonium salts (preferably $C_1$–$C_{12}$ alkyls) are examples of the type of amino compounds which are useful. Specific examples of useful compounds are hexamethylenediamine tetra, hexapotassium hexamethylenediamine and alkyl dimethyl quaternary ammonium nitrate. The amount of this inhibitor may vary in the range of about 0.1 to 2.0 wt. %. Inhibitor application in accordance with the present invention is more important in low lead and lead-free galvanizing, which process is very sensitive to different unfavorable factors, like insufficient surface cleanliness, bad pickling, high level of iron in the preflux, and so on.

The efficiency of the inhibitor used in this aspect of the invention may be increased by also including in the preflux a nonionic surfactant which, when combined, reduce preflux surface tension to 27 to 30 dyn/cm. Examples of suitable surfactants for this purpose are ethoxylated alcohols such as nonyl phenol ethoxylate.

Additional advantages of preheating to a high temperature, which becomes possible due to the use of the thermally resistant preflux of the present invention, is increasing equipment productivity, as well as energy savings during kettle operations. Also, the ability to run the kettle at a lower temperature results in decreased wear of the kettle, and so on.

It should also be understood that the thermal resistant prefluxes of this invention can also function successfully at lower preheating temperatures (120° to 180° C.), since they are universal as to the temperature preheating range, as well as with conventional galvanizing zinc baths, e.g., containing up to 1 wt. % lead.

The first version of the present invention, based on the use of the inventive thermally resistant preflux, is illustrated by the following examples:

EXAMPLE 1

Steel panels 4×50×150 mm in size after cleaning, pickling and rinsing are immersed in a preflux aqueous solution at a temperature of 80° C. and containing (wt. %): zinc chloride—17, ammonium chloride—5.0, boric acid—0.5, nonionic surfactant Merpol HCS (DuPont—)—0.05, inhibitor Ethomeen (Akzo US)—0.04. The panels are then heated for 5 minutes to 250° C. and dipped in molten Special High Grade zinc (0.003% lead) at 455° C. Steel surface wetting and zinc coating adhesion are perfect.

EXAMPLE 2

On a continuous industrial galvanizing line, a steel strip 1200 mm wide and 0.5 mm thick is cleaned in an alkaline cleaner, pickled in 10% HCl solution, rinsed and immersed in preflux solution at a temperature of 80° C. and containing (wt. %): zinc chloride—15.0, ammonium chloride—2.0, boric acid—0.8, nonionic surfactant Merpol HCS—0.08, inhibitor Ethomeen—0.05. The strip is heated in a tower furnace to 320° to 340° C. for 40 seconds and then dipped into molten zinc with 0.1% lead at the temperature of 460° C. The quality of the zinc coating, as well as its adhesion, is very good.

Some galvanizing plants use top-fluxes to prevent molten metal spattering and oxidizing. Top-fluxes are widely used in pipe and conduit galvanizing. If the steel surfaces of such articles are not cleaned or pickled properly, or if the preflux doesn't perform well, the top-flux helps to wet steel parts by molten zinc.

However, after a little while the top-flux becomes saturated with oxygen, which is supplied by the oxidized steel surface and is also absorbed from the air. Aluminum and zinc oxides are then accumulated in the top-flux due to the presence of oxygen. As a result, the flux becomes very viscous, sticks to the part surface and creates black spots. This deleterious effect of thick top-fluxes is very pronounced with low lead or lead-free galvanizing. If the top-flux becomes oxidized, the results are even worse. That is why top-fluxes being in neutral or reducing conditions is very important.

A further subject of the present invention is top-flux formulations. In accordance with the present invention, such top-fluxes together with zinc chloride and ammonium chloride contain a deoxidizer, like graphite, charcoal, silicon carbide, bithmuth and the like, preferably in dispersed form, such as a powder or the like. The amount of deoxidizer may vary in the range of about 0.1 to 1.0 wt. %, preferably somewhere between 0.2 to 0.7%. In the presence of a deoxidizer, the flux remains liquid all the time, does not stick to the steel surface and does not deteriorate the performance of the preflux.

In a preferred embodiment of this aspect of the present invention, a top-flux formulation is provided, which together with zinc chloride, ammonium chloride and deoxidizer, also contains chromium chloride, i.e., $CrCl_3$. While passing through the top-flux, a steel surface absorbs some amount of chromium chloride, which is reduced to metallic chromium in molten zinc. As a result, adhesion of the zinc coating to the steel surface is greatly improved. Chromium chloride amounts may vary in the range of about 0.5 to 3.0 wt. %, but preferably should be within 0.8 to 1.5 wt. %.

It is desirable to have some organic foaming agent in the top-flux formulation in the range of about 0.2 to 1.5 wt. %, as described in U.S. Pat. No. 2,473,579, the disclosure of which is incorporated herein by reference. Preferred foaming agents are 1,4-diamino anthraquinone, purpurin, 2-chloro-1,4-dihydroxy anthraquinone, β-sulfonic acid anthraquinone and phthalic anhydride.

It is also preferred that in this embodiment of the invention the molten zinc used for galvanizing contain at least some aluminum, e.g., 0.01 wt. %, preferably 0.1 wt. %, or more to promote improved adhesion.

As it was mentioned, the top-flux of the present invention can be used either with the thermally resistant preflux of the present invention or some other conventional preflux, in which case parts may be preheated to a lower temperature, for example 120° to 180° C.

The second version of the present invention in which a novel top-flux is used can be illustrated by the following example:

EXAMPLE 3

Steel pipes 6–8 m long and 19–100 mm in diameter are cleaned in alkaline cleaner, pickled to remove rust, rinsed and immersed in a preflux solution at 80° C. and containing (wt. %): zinc chloride—20.0, ammonium chloride—22.0, Merpol SCH—0.1, Ethomeen—0.05.

After withdrawing from the preflux tank, the pipes are dried and preheated for 6 to 7 minutes to 140° C., after which they are immersed in molten Special High Grade zinc (0.003% lead) through the top-flux, which comprises (wt. %): zinc chloride—62.7, ammonium chloride—35.0, chromium chloride—1.5, graphite powder—0.3, foaming agent comprising phthalic anhydride—0.5. All pipes have good zinc coating without black spots on either the outer or inner surfaces, as well as very good adhesion.

Thus, the present invention provides, among other things, a novel preflux comprising about 8 to 30, preferably 15 to 20, wt. % zinc chloride, about 2 to 20 wt. % ammonium chloride, about 0.1 to 1.0, preferably 0.5 to 0.8, wt. % boric acid or salt thereof, optionally and preferably about 0.1 to 5 wt. % of a metal chloride, about 0.1 to 2.0, preferably 0.5 to 1.0, wt. % of an inhibitor, preferably an aliphatic amino derivative, optionally and preferably about 0.1 to 2.0, more preferably 0.5 to 1.0, wt. % of a nonionic surfactant, with the balance being a suitable carrier such as water. For convenience, such compositions can be formulated as concentrates to be diluted by the ultimate user. An exemplary concentrate composition is composed of about 35 wt. % zinc chloride, about 3.5 wt. % ammonium chloride, about 1.75 wt. % boric acid, about 0.6 wt. % KCl, about 0.6 wt. % NaCl, about 0.05 wt. % inhibitor and about 0.02 wt. % surfactant.

In addition, the invention further provides a novel top-flux comprising about 30 to 90, preferably about 60 to 65, wt. % zinc chloride, about 10 to 55, preferably 20 to 40, wt. % ammonium chloride, about 0.1 to 3.5, preferably 0.5 to 3.0, wt. % chromium chloride, optionally and preferably about 0.5 to 2.5 wt. % potassium chloride and an additional 0.5 to 2.5 wt. % sodium chloride, about 0.1 to 1.0, preferably 0.2 to 0.4, wt. % deoxidizer and about 0.2 to 1.0, preferably about 0.6 to 0.9, wt. % foaming agent.

Although only a few embodiments have been described above, many modifications can be made without departing from the spirit and scope of the invention. All such modifications are intended to be included within the present invention, which is to be limited only by the following claims:

We claim:

1. A preflux for galvanizing steel comprising about 8 to 30 wt. % zinc chloride, about 2 to 20 wt. % ammonium chloride, about 0.1 to 1.0 wt. % boric acid or salt thereof, and about 0.1 to 2.0 wt. % inhibitor.

2. The preflux of claim 1, wherein said inhibitor is an aliphatic amino derivative.

3. The preflux of claim 2, wherein said preflux contains about 0.1 to 5.0 wt. % alkali or alkaline earth metal chloride.

4. The preflux of claim 3, wherein said inhibitor is selected from the group consisting of aliphatic alkyl amino compounds and aliphatic quaternary ammonium salts and further wherein said surfactant is nonionic.

5. The preflux of claim 4, wherein said preflux comprises about 8 to 20 wt. % zinc chloride, about 2 to 20 wt. % ammonium chloride, about 0.5 to 0.8 wt. % boric acid or an alkali or alkaline earth metal salt thereof, about 0.1 to 5.wt. % of an alkali or alkaline earth metal chloride, about 0.5 to 1.0 wt. % of an inhibitor selected from the group consisting of aliphatic alkyl amino compounds and aliphatic quaternary ammonium salts, about 0.5 to 1.0 wt. % of a nonionic surfactant and the balance water.

6. A top-flux for use in galvanizing steel, said top-flux comprising about 30 to 90 wt. % zinc chloride, about 10 to 55 wt. % ammonium chloride, about 0.1 to 3.5 wt. % chromium chloride, about 0.1 to 1.0 wt. % deoxidizer, and about 0.2 to 1.0 wt. % foaming agent.

7. The top-flux of claim 6, wherein said deoxidizer is graphite, charcoal, silicone carbide or bismuth.

8. The top-flux of claim 7, wherein said foaming agent is 1,4-diamino anthraquinone, purpurin, 2-chloro-1,4-dihydroxy anthraquinone, $\beta$-sulfonic acid anthraquinone or phthalic anhydride.

9. The top-flux of claim 7, wherein said top-flux comprises 60 to 65 wt. % zinc chloride, about 20 to 40 wt. % ammonium chloride, about 0.5 to 3.0 wt. % chromium chloride, about 0.5 to 2.5 wt. % potassium chloride, about 0.5 to 2.5 wt. % sodium chloride, about 0.1 to 1.0 wt. % deoxidizer, and about 0.6 to 0.9 wt. % foaming agent.

10. The top-flux of claim 6, wherein said top-flux is molten.

11. A galvanizing bath for galvanizing steel comprising
   (a) a molten zinc bath containing no more than 0.1 wt. % lead, and
   (b) a molten layer of top-flux on said molten zinc bath, said top-flux comprising the top-flux of claim 6.

12. The galvanizing bath of claim 11 wherein said molten zinc bath contains aluminum.

13. A process for galvanizing the surface of a steel article, said process comprising
   (a) applying a preflux to said surface to form a preflux layer thereon, said preflux comprising about 8 to 30 wt. % zinc chloride, about 2 to 20 wt. % ammonium chloride, about 0.1 to 1.0 wt. % boric acid or salt thereof, and about 0.1 to 2.0 wt. % inhibitor;
   (b) heating said article to a temperature above 180° C.; and
   (c) applying molten zinc containing no more than 0.1 wt. % lead to said surface.

14. The process of claim 13, wherein said article is heated to a temperature of about 200° to 350° C. in step (b).

15. The process of claim 14 wherein said molten zinc contains aluminum.

16. A process for galvanizing the surface of a steel article, said process comprising
   (a) applying to said surface a preflux containing zinc chloride and ammonium chloride, and
   (b) immersing said article in a galvanizing bath comprising
      (i) molten zinc containing no more than 0.1 wt. % lead, and
      (ii) a molten layer of top flux on said molten zinc, said top flux comprising about 30 to 90 wt. % zinc chloride, about 10 to 55 wt. % ammonium chloride, about 0.1 to 3.5 wt. % chromium chloride, about 0.1 to 1.0 wt. % deoxidizer, and about 0.2 to 1.0 wt. % foaming agent.

17. The process of claim 16, wherein said molten zinc bath contains aluminum.

* * * * *